(12) United States Patent
Lewis et al.

(10) Patent No.: US 7,853,261 B1
(45) Date of Patent: Dec. 14, 2010

(54) MULTIPLE COMMUNICATION CHANNEL ROUTER

(75) Inventors: John Ervin Lewis, Lawrenceville, GA (US); Jeffrey Clinton Mikan, Cumming, GA (US); Justin McNamara, Atlanta, GA (US); Fulvio Cenciarelli, Suwanee, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 757 days.

(21) Appl. No.: 11/610,335

(22) Filed: Dec. 13, 2006

(51) Int. Cl.
*H04W 40/00* (2009.01)

(52) U.S. Cl. ................... 455/445; 455/405; 455/406; 455/428; 455/446; 455/465; 379/16; 379/273

(58) Field of Classification Search ........... 455/445, 455/405–406, 428, 446, 465; 379/16, 273
See application file for complete search history.

(56) References Cited

U.S. PATENT DOCUMENTS

| | | | |
|---|---|---|---|
| 7,302,272 B2 * | 11/2007 | Ackley | 455/466 |
| 2007/0206570 A1 * | 9/2007 | Gernert et al. | 370/352 |
| 2007/0248103 A1 * | 10/2007 | Delaney et al. | 370/395.52 |
| 2008/0101567 A1 * | 5/2008 | Baudino et al. | 379/114.01 |

OTHER PUBLICATIONS

Kim, R., "The new wave of cell phones: Will they ring out landlines?" SouthCoastToday.com, Oct. 15, 2006, downloaded Oct. 20, 2006, 3 pages.
Ludington, J., "Cell Phone to Landline Converter," *Ludington Media West, LLC.*, downloaded Oct. 20, 2006, 3 pages.

* cited by examiner

*Primary Examiner*—Kamran Afshar
*Assistant Examiner*—Munsoon Choo
(74) *Attorney, Agent, or Firm*—Woodcock Washburn LLP (57) ABSTRACT

A multiple communication channel router is provided. A communications device such as a telephone may send communications to the router, which may then determine an appropriate communications network, such as the circuit-switched network associated with the landline telephone or a cellular network or packet-switched network associated with a broadband internet connection. The choice of network may be made intelligently based on cost, user preference, or other parameters.

40 Claims, 6 Drawing Sheets

MULTIPLE COMMUNICATION CHANNEL ROUTER

BACKGROUND

Telephone communications technology has been evolving so rapidly that many individuals and businesses presently own multiple communications devices associated with different network types. For example, an individual or business may have a landline telephone that enables calls via a traditional circuit-switched telephone network, a cellular telephone or Personal Digital Assistant (PDA) device that enables calls via a cellular network, and a personal computer that enables calls over a packet-switched network such as a broadband internet connection.

A variety of problems arise from the multiple devices and network types available to today's telephone users. First, those wishing to contact an owner of multiple telephones may experience confusion as to which telephone number to dial.

Second, multiple devices may be under-utilized or ineffectively utilized. For example, consider a family that owns both a landline telephone and a cell phone. If the cell phone is away from the home or has little or no remaining battery life, a call to the cell phone may go unanswered by family members in the home.

Third, users may have difficulty determining which network will be most cost-effective at a particular time. For example, it may be possible to use a cell phone at no additional cost to the user so long as the user does not exceed a number of prepaid minutes in the cell phone billing plan. However, users may not be aware of how many available "free" minutes remain. It may also be difficult to remember the details of billing plans associated with multiple devices and to quickly and conveniently assess which device and associated network will cost least.

There is a need in the industry to provide additional flexibility to owners of multiple telephone communications technologies.

SUMMARY

In consideration of the above-identified shortcomings of the art, the present invention provides a multiple communication channel router, method for using such a router, and computer readable media as may be utilized in such a router.

In a first embodiment, a multiple communication channel router is provided comprising a first device communications channel configured to send and receive communications from a first communications device, for example a cellular telephone. The first communications device is configured to communicate with a first communications network, for example a cellular network, using a first communications protocol.

A second device communications channel is configured to send and receive communications from a second communications device, for example a landline telephone. The second communications device is configured to communicate with a second communications network, for example a circuit switched network, using a second communications protocol, said second communications protocol being different from said first communications protocol.

Furthermore, a first network communications channel is configured to send and receive communications from said first communications network. A second network communications channel is configured to send and receive communications from said second communications network. Logic is provided for selecting from among said network communications channels upon receiving communications from a communications device, wherein any of said network communications channels may be selected for said communications from, for example, said first communications device.

Thus, for example a call initiated with a cell phone can send communications to the router, and the router may determine to use the circuit switched network or the cellular network for the call.

In another aspect, the router may further comprise a subsystem for sending communications to a cellular telephone via a packet-switched network. For example, if the cellular telephone is connected to the internet for example by being in range of a wireless hot-spot, the router may rout a call initiated at a landline telephone device in the home through the cell phone via a broadband connection to the internet.

In another aspect, the router may further comprise a third network communications channel configured to send and receive communications from a third communications network, said third communications network comprising a packet-switched network. The third network communications channel can utilize, for example, a broadband internet connection and a Voice Over Internet Protocol (VoIP) communications protocol.

In another aspect, the first device communications channel comprises a subsystem for wireless communications with said cellular telephone. The cell phone can detect the wireless communications from the router and direct communications to the router when in range using, e.g., an IEEE 802.11 protocol.

In another aspect, the first network communications channel utilizes the cellular telephone to send communications via the cellular network by sending said communications from said second communications device to said cellular telephone. For example, where the landline telephone initiates a call through the router, and the router determines to route the call via the cellular network, the router may send communications to the cell phone which in turn connects to the cellular network.

In another aspect, the logic for selecting comprises logic for determining a lowest cost communications network. Factors to account for may include, for example, a destination of said communications from a first communications device, whether said destination is an in-network destination, a number of available minutes in a communications network billing plan, and a time of day.

Moreover, the logic in the router may determine an available communications channel—for example by determining any channels that are not in use. User defined preferences may also be taken into account.

In another aspect, the router may further comprise logic for selecting from among said device communications channels upon receiving communications from a communications network, wherein any of said device communications channels may be selected for said communications from said first communications network. This logic may supplement or replace the logic for selecting a communication network. Thus, for example a call to a landline telephone may be routed instead to the cell phone, or to both landline telephone and cell phone. This logic can account for a destination associated with an incoming communication, as well as any user defined preferences.

In a next embodiment, a method for selecting among a plurality of available communications networks is provided. Such a method may comprise receiving communications from a first communications device, such as a cell phone, and selecting a communications network (such as a circuit-switched network traditionally associated with landline telephones) from among a plurality of communications networks. The plurality of communications networks may comprise, for example, two or more of a cellular network, a circuit switched network, and a packet switched network. The communications received from the first communications device may then be sent via the selected communications network.

In a next embodiment, a method is provided for selecting among a plurality of communications devices. Such a method comprises receiving communications from a first communications network, such as a cellular network, selecting a communications device from among a plurality of communications devices, said plurality of communications devices comprising at least a cellular telephone and a landline telephone, and sending said communications from said first communications network to a selected communications device. For example, an incoming call from a cellular network may be routed to a landline telephone, or to both a landline telephone and a cell phone.

Other advantages and features of the invention are described below.

BRIEF DESCRIPTION OF THE DRAWINGS

The systems, methods, and computer readable media associated with a multiple communication channel router are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
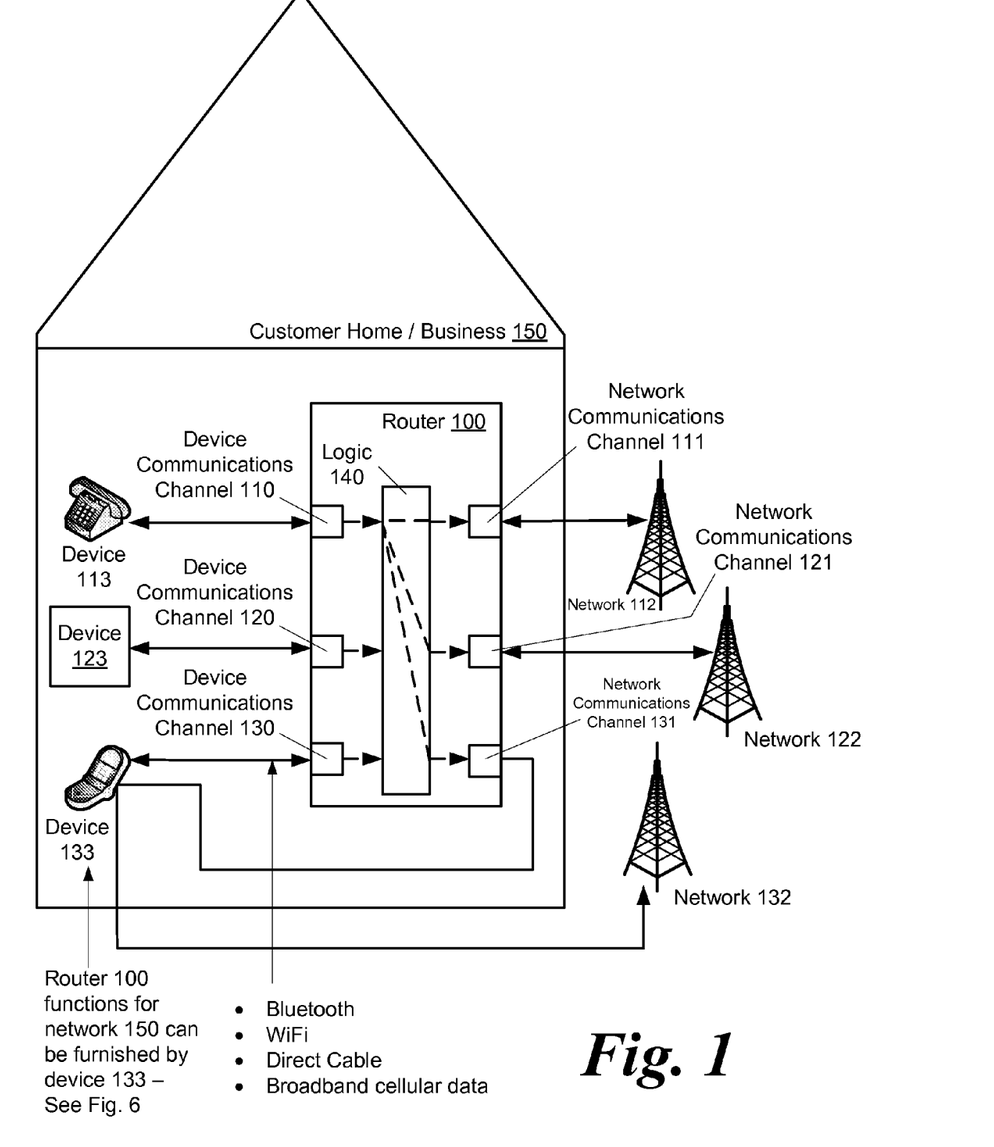
FIG. 1 illustrates a customer home or business equipped with a multiple communication channel router which can communicate via a plurality of device communications channels and also via a plurality of network communications channels.

FIG. 1 illustrates a multiple communication channel router 100 in accordance with one embodiment of the invention. It is contemplated that such a router may comprise a unit in a customer home or business 150. For example, a customer may purchase such a router 100 and install it in the home 150 to facilitate communications using the multiple telephone services available to the customer.

Router 100 may be installed, for example, by connecting a telephone line associated with a traditional circuit-switched telephone network 112 to a network communications channel 111. A cable associated with a broadband cable connection to a packet switched network 122 may also be connected to a network communications channel 121. The router 100 may be configured to connect to a cellular network 132 using another network communications channel 131.

Network communications channels such as 111, 121, and 131 comprise the various electronics necessary to connect to networks 112, 122, and 132. As such, network communications channels such as 111, 121, and 131 may include hardware, such as circuitry and physical interfaces, for connecting to cables typically associated with the various networks 112, 122, and 132.

For example, a telephone jack for sending and receiving communications from a landline telephone, and associated circuitry may comprise one part of network communications channel 111 for connecting to circuit switched network 112. If telephone functionality is included in the router 100, then it may be possible to connect the network communications channel 111 directly to a telephone line where it enters the house. Alternatively, a wireless connection to a telephone base station of the type associated with cordless landline telephones may comprise one part of network communications channel 111.

A coaxial cable connection, Ethernet jack, or wireless circuitry for connecting to a wireless router may comprise one part of network communications channel 121 for connecting to packet-switched network 122. The network communications channel 121 may implement a Voice Over Internet Protocol (VoIP) communications protocol for transmitting voice information over a packet-switched network, or may connect to another device that performs such functions on behalf of the router 100. Network communications channel 121 may implement a Hyper Text Transfer Protocol (HTTP), which can be used advantageously for Operations Administration Maintenance OAM involving the router 100.

Appropriate cables or wireless circuitry may comprise one part of network communications channel 131 for connecting to cellular network 132. For example, a cable may connect network communications channel 131 to a device 133 such as a cellular telephone so that router 100 can connect to the cellular network 132 via the cellular telephone 133. In this embodiment, network communications channel 131 comprises the appropriate interface for the cable as well as circuitry for connecting to and controlling the cell phone 133 to the extent necessary to send communications to the cellular network 132.

Alternatively, a wireless connection may be established between network communications channel 131 and a cell phone 133 to the extent necessary for the router to send communications to the cellular network 132. In such an embodiment, the network communications channel 131 comprises the appropriate wireless transmission apparatus as well as circuitry for connecting to and controlling the cell phone 133.

In the field of cellular telephones, development of Fourth Generation (4G) technologies has begun, with the projected release of the first commercial networks in 2010. 4G technology may enable pervasive networks in which a user can seamlessly move between several wireless access technologies, e.g., Wi-Fi, UMTS, Enhanced Data Rates for GSM Evolution (EDGE) or any other wireless access technologies. 4G may also include smart-radio technology to efficiently manage spectrum use and transmission power.

A cell phone for use in embodiments of the invention may comprise both apparatus for communicating with a cellular network and apparatus for communicating with a packet-switched network, for example, when the cell phone comes within range of a wireless hotspot. If the cell phone detects the presence of an available "hot-spot" or IEEE 802.11 type wireless signal, the cell phone may automatically connect to the devices associated with the packet-switched network.

The cell phone may then initiate calls via the packet-switched network instead of through the cellular network. If a router 100 in accordance with an embodiment of the invention is present, the cell phone can wirelessly connect to the router, then make calls via any available network through the router. Similarly, once the cell phone is in communication with the router 100, the router may utilize the cell phone to connect to the cellular network.

In another embodiment, the network communications channel 131 may be configured to establish an independent connection to the cellular network 132, using for example a same mobile communications apparatus as presently used in cell phones. In this embodiment, it may be advantageous to configure the network communications channel 131 to connect to cellular network 132 as if it were a customer's cell phone 133. In other words, the router 100 may connect to cellular network 132 in such a way that router 100 appears to the network 132 to in fact be cell phone 133. This way, the customer's cell phone account can be appropriately billed for any communications on the cellular network, and access to the network 132 may be facilitated.

A network communications channel such as 131 may of course alternatively use any other means of communicating with a network, such as sending circuit switched data via a circuit switched network, or utilizing General Packet Radio Service (GPRS), High-Speed Downlink Packet Access (HSDPA) protocols, or any cellular wireless data protocol.

In order for the router 100 to independently connect to cellular network 132 as if it were another device 133, it may be necessary for device 133 to deliver certain account and/or network configuration data to the router 100, or for such configuration data to be downloaded to the router 100 from the cellular network 132 after appropriate permissions are established.

Router 100 may further comprise a plurality of device communications channels 110, 120, 130 configured to send and receive communications from a customer's various communications devices 113, 123, 133. Device communications channels 110, 120, 130 are configured by including appropriate electronics hardware and physical interfaces for connecting to communications devices 113, 123, 133.

For example, in the case of a landline telephone communications device 113, a telephone jack into which a telephone receiver can be plugged, and associated circuitry may comprise one part of device communications channel 113 for sending and receiving communications from device 113. Alternatively, a wireless connection to a cordless landline telephone receiver device 113 may comprise one part of device communications channel 110.

In the case of a device 123 for communication over a packet switched network, such as a personal computer equipped with audio input and output functions, a coaxial cable connection, Ethernet jack, or wireless circuitry may comprise one part of device communications channel 120 for sending and receiving communications from device 123.

In the case of a cell phone 133, appropriate cables or wireless circuitry may comprise one part of device communications channel 130 for sending and receiving communications from the communications device 133. For example, a cable which may be the same cable used for the network communications channel 131 may connect device communications channel 130 to the cell phone. In this embodiment, device communications channel 130 comprises the appropriate interface for the cable as well as circuitry for sending and receiving communications from device 133.

Alternatively, a subsystem for wireless communications with the cellular telephone, e.g., the same wireless connection used by the network communications channel 131, may be established between device communications channel 130 and cell phone 133. In such an embodiment, the device communications channel 130 comprises the appropriate wireless transmission apparatus as well as circuitry for sending and receiving communications from device 133. The subsystem for wireless communications may implement an IEEE 802.11 (WiFi) specification. Wireless communications may also be implemented, for example, using the BLUETOOTH® protocol or broadband cellular data protocols.

In embodiments in which the cable and/or wireless connection to the cell phone is the same for both the network communications channel 131 and device communications channel 130, such channels 130, 131 may share hardware and electronics. In embodiments in which router 100 makes an independent connection to cellular network 132, there may be less shared hardware. For example, in one contemplated embodiment, a cell phone automatically turns off its cellular network connection when in wireless range of the router 100, and communicates with the router 100 via an 802.11 protocol associated with the device communications channel 130, while the router 100 independently connects to cellular network 132 via the network communications channel 131.

FIG. 1 illustrates devices 113, 123, 133 that are each configured to communicate with a communications network 112, 122, 132 using a different and distinct communications protocol. For example, it will be appreciated that a circuit-switched network 112 utilizes a different communications protocol than a packet-switched network 122, which is also different from that of a cellular network 132. A landline telephone 113, for example, is natively configured to communicate over the circuit-switched network 112 using the appropriate protocols. In one exemplary embodiment, such a protocol may comprise, for example a Registered Jack 11/Plain Old Telephone Service (RJ-11/POTS) protocol. The router 100 may advantageously support Call Detail Records (CDR) for all devices that connect to it.

One function of the router 100 is to route telephone calls initiated from a first device, e.g., 113, over a network that is not natively associated with such device, e.g. 132. In one embodiment, this can be done when the router is configured send and receive communications using protocols associated with the various networks 112, 122, 132. In another embodiment the router 100 is able to route calls over the various networks 112, 122, 132 by being coupled to devices that implement the appropriate protocols, and by being able to control such devices to the extent necessary to initiate a telephone call, and send and receive communications to a selected network via the device. Aspects of the above embodiments may also be "mixed and matched" using different approaches for each network communications channel. This covers device to device calling. Also, in addition to device-to-device calling embodiments, abbreviate dialing plans can be used between devices registered on a home/business network that exists for example in the home or business 150. Devices do not have to be located in the same vicinity to register.

In one embodiment, the router 100 comprises logic 140 for selecting from among the network communications channels 111, 121, 131 (or if communications are routed directly to a device, from among 110, 120, and 130) upon receiving communications from a communications device, e.g. 113, wherein any of said network communications channels 111, 121, 131, may be selected for said communications from said communications device 113. This aspect of the router 100 is illustrated by the dotted lines inside logic 140 in FIG. 1. For example, when a call is initiated using landline telephone 113, logic 140 may select any of the network communications channels 111, 121, 131, and thereby send the call over any of the communications networks 112, 122, 132. Similar selection of any network communications channel/network may be made for calls initiated by device 123 or device 133.

Figure 5:
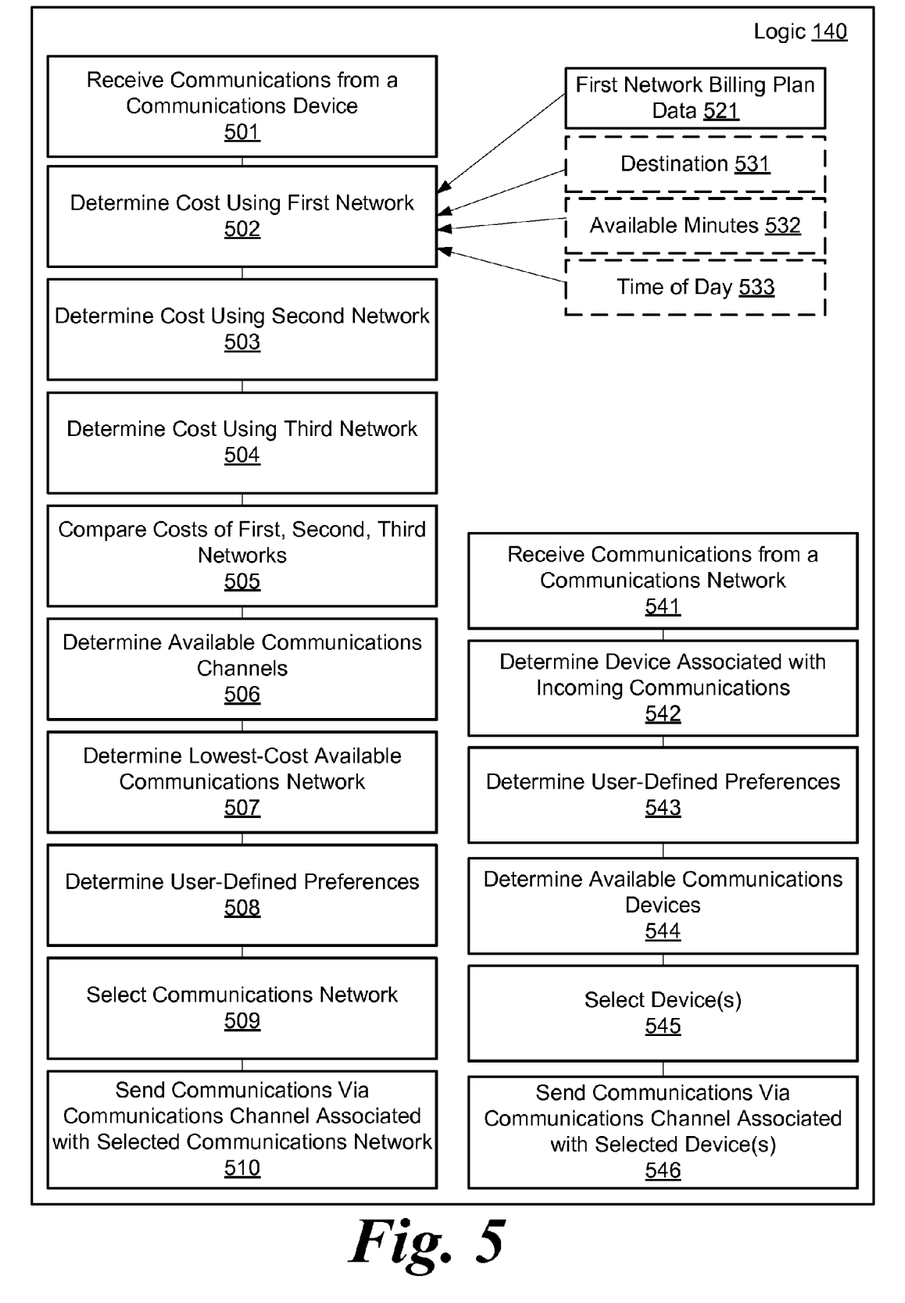
FIG. 5 illustrates exemplary logic as may be included in a multiple communication channel router.

The logic 140 for selecting from among the network communications channels 111, 121, 131, may use any of a variety of criteria to perform its selection. FIG. 5 illustrates a detailed view of exemplary aspects of logic 140. In one embodiment, logic 140 may be configured to determine a lowest cost communications network. Factors such as network availability and user preferences may be accounted for in conjunction with the least-cost determination. In other embodiments, such factors may be used independently to select a network as will be appreciated.

For example, logic 140 may comprise a first component for receiving communications from a communications device 501. Such communications may reflect a call initiation. Logic 140 then goes through a network selection process that may comprise, for example, determining a cost of various networks 502, 503, and 504, or, alternatively or in combination, an availability of the various connected devices on a network.

Determining a cost of a network 502 may be conducted as a series of logical steps that use call data 531, 532, 533, to determine a cost under a billing plan 521. For example, a call destination 531 can be accounted for by determining a destination of a call, then comparing the destination to destinations in the billing plan data 521.

Under many landline telephone service billing plans, local calls within a predefined geographical area are "free" in that they do not incur extra charges, while long-distance charges cost a customer extra money on their telephone bill. Thus, if it is determined that a call destination 531 is to a local destination under the billing plan 521, and that calls to such destinations do not incur charges, the logical step 502 may conclude that the cost of using the circuit switched network is zero. Otherwise, if a long distance call, step 502 may determine the cost of the call.

Similarly, some cell phone service providers account for call destination in a billing plan by not charging customers for "in-network" calls. Imagine now that billing plan 521 is associated with a cellular network. If it is determined by 502 that a call destination 531 is an in-network destination under the billing plan 521, and that calls to such destinations do not incur charges, the logical step 502 may conclude that the cost of using the cellular network is zero.

In another example, logic for determining a cost of a communications network 502 accounts for a number of available minutes in a communications network billing plan 521. Here, the logic of 502 may determine a number of available minutes 532 remaining to a cell phone customer, for example by receiving such information from a cell phone, or tracking such information, or by retrieving such information via the cellular network, via web or IP based protocols, or via Unstructured Supplementary Service Data (USSD). If additional daytime minutes remain available, then the logical step 502 may conclude that the cost of using the cellular network is zero. However, if all the minutes in a particular billing cycle are used, then step 502 may determine a cost of a telephone call from billing data 521.

In another example, logic for determining a cost of a communications network 502 accounts for a time of day. Here, the logic of 502 may determine a present time 533, for example by receiving such information from a telephone initiating a call, or from an internal clock for tracking such information, or by retrieving such information from a communications network. If a call is made during a designated "free" period, as determined from billing data 521, then the logical step 502 may conclude that the cost of using the network associated with the billing plan data 521 is zero. Otherwise, if the billing plan 521 indicates that charges will be incurred, then step 502 may determine an amount of such charges.

Once steps 502, 503, and 504 have determined costs of using various networks for a particular call, the costs can be compared 505. The cheapest network can be considered the preferred network for the call, while the other networks are ranked by cost as potential backup networks for the call.

It may be advantageous to account for a variety of other factors prior to initiating the call, for example network availability 506. Here, the network communication channels can be checked to determine which are active. For example, in embodiments where a router must connect to a cellular network via a cell phone, the cellular network will be unavailable whenever the cell phone is not in communication with the router. If the cell phone communicates wirelessly with the router, the cell phone may be unavailable if it is carried out of wireless communications range.

In such a scenario, the router may determine that a cellular network communication channel is not available. If a call is initiated, for example, using a landline telephone, the only available networks may be the circuit switched network and the packet-switched network. Logical step 506 may remove the cellular network as a viable option for the call, regardless of whether it is the lowest cost network for the call. After determining available communication channels 506, step 507 may be performed to determine a lowest cost available communications network.

Logic 140 may also comprise logic allowing router 100 to provide useful functions such as the ability to put a device "on hold" to answer other lines.

In one embodiment, user-defined preferences can also be accounted for in logical step 508. User-defined preferences may specify scenarios in which a one network is preferred over another. For example, a user may get low transmission quality over a cellular network in the home. The user may thus prefer to use a circuit switched network if such network is available. The cellular network can be used if the circuit switched network is not available.

In another example, a user may prefer to use one network over another for certain call destinations. If the user knows that certain call destinations are associated with long telephone talk times, for example, he may wish to use a network that is best suited for this purpose. Numerous other situations may arise in which user preferences may be useful.

After determining network cost, availability, and user preferences, a communications network may be selected in logical step 509 and communications may be sent via the communications channel associated with the selected communications network 510.

Figure 2:
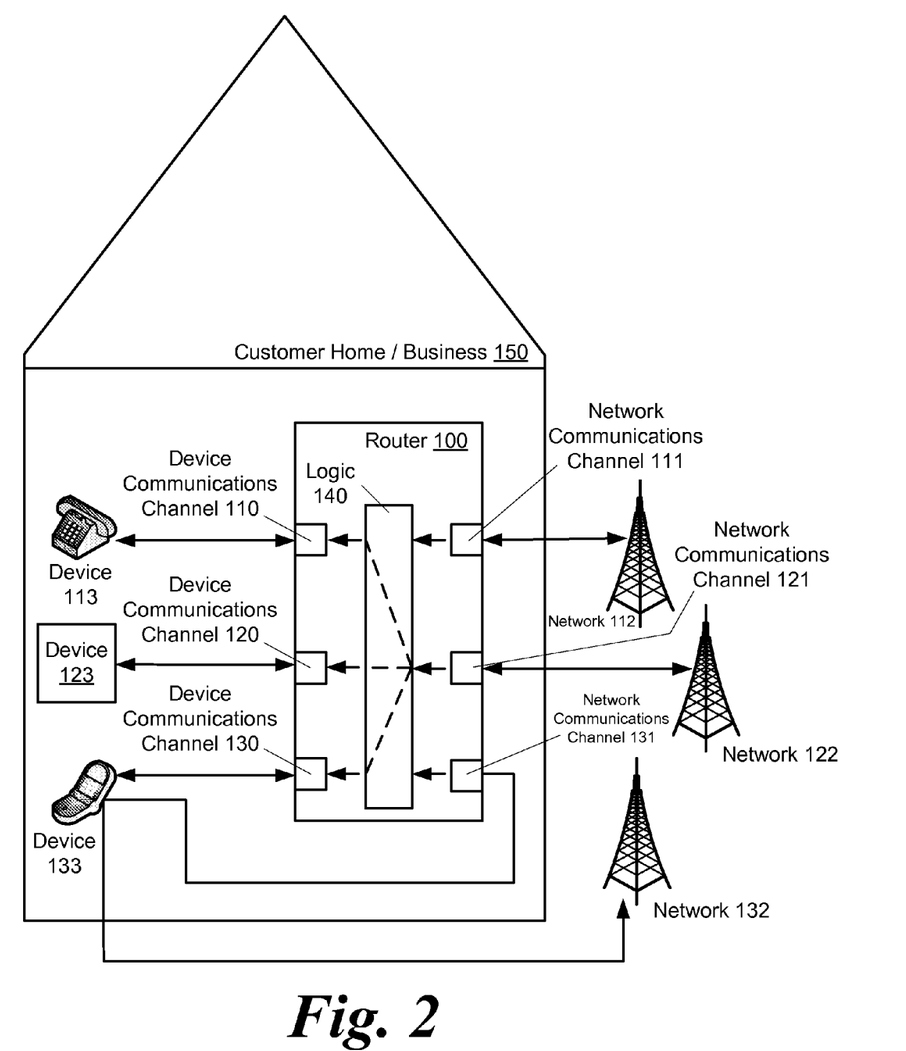
FIG. 2 illustrates a customer home or business equipped with a multiple communication channel router, where the router is illustrated as receiving communications from a network, selecting one or more devices, and sending communications to any of the selected devices.

Logic 140 may also comprise logic for selecting from among device communications channels, as illustrated by steps 541-546 in FIG. 5, and also by the dotted lines within logic 140 in FIG. 2. Referring briefly to FIG. 2, upon receiving communications from a communications network, e.g., packet switched network 122, logic 140 may select any of the device communications channels 110, 120, 130. Thus, for example, an incoming call to a VoIP-enabled personal computer over a packet-switched network can be instead routed to a cell phone 133, or to a cell phone 133, landline telephone receiver 113, VoIP communications device 123, or some combination thereof.

In one embodiment, emergency calls such as 911 can have fixed routing with failover. For example, a 911 call from a cellular device would bypass the router and use the cellular network to complete the call, unless cellular service is unavailable. If cellular service is unavailable, then the cell phone could connect to the router so as to fall back to another network such as the circuit switched network, the fall back to a packet switched VoIP network if event the circuit switched network is unavailable. In any event, where a preferred network in terms of likelihood of an immediate and strong connection is unavailable, an alternate network would be chosen in an order defined in the configuration or logic in the router for dynamic selection of the best network path.

Referring back to FIG. 5, first, communications are received from a communications network 541. Next, any number of steps may be performed to select a communications device. For example, in one embodiment, a device may be determined that is associated with incoming communications 542. A device that is associated with incoming communications is a device that can natively communicate over the network from which such incoming communications were received. Thus, a landline telephone would be a device associated with a circuit switched network and a cell phone would be a device associated with a cellular network. Logic 542 may determine a device that is associated with incoming communications and may use that information in determining which device to send the communications to.

For example, a device for which an incoming communication is intended may be preferred over other devices. This may have certain emergency applications—for example, if an incoming call is from the police, firefighters, or other emergency response organization, it may be preferred to send the call only to the device for which the call is intended. Conversely, it may be preferable to send calls from such organizations to all devices.

In another embodiment, user-defined preferences may be accounted for in determining which device to send communications to 543. Calls originating from certain numbers may be always sent to a particular device, if a user specifies such a preference. Calls originating from certain pre-defined networks may also be sent to particular device(s).

In another embodiment, available communications devices may be accounted for 544. For example, if a cell phone is out of wireless communications range of the router, it may not make sense to send incoming communications to the cell phone.

Finally, communications device(s) are selected based on any number of the factors as determined by 542-544, and communications may be sent via a communications channel associated with the selected device(s).

Figure 3:
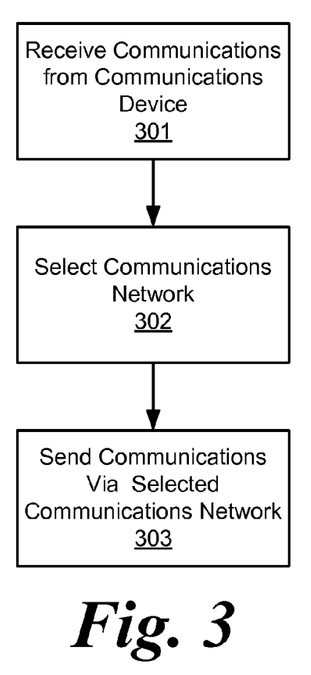
FIG. 3 illustrates a method comprising selecting a communications network.
Figure 4:
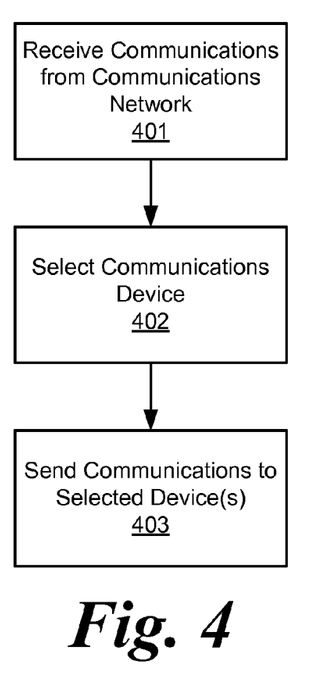
FIG. 4 illustrates a method comprising selecting a communications device.

FIGS. 3 and 4 illustrate methods that may be performed by a router 100 as described above. The various steps of the methods should be readily understood with the benefit of the above description of the router 100.

FIG. 3 illustrates a method for selecting among a plurality of available communications networks, comprising receiving communications from a first communications device 301, for example, from a landline telephone receiver. Next, a communications network is selected 302 from among a plurality of communications networks as depicted in FIGS. 1 and 2. The plurality of communications networks 112, 122, 132 may comprise two or more of a cellular network, a circuit switched network, and a packet switched network. Finally, having selected a network, the communications from a communications device are sent 303 via the selected communications network.

FIG. 4 illustrates the reverse operation from that depicted in FIG. 3, namely a method for selecting among a plurality of communications devices, comprising receiving communications from a first communications network 401, for example, from a circuit-switched network. Next, a communications device is selected 402 from among a plurality of communications devices as depicted in FIGS. 1 and 2. The plurality of communications devices 113, 123, 133 may comprise, for example, at least a cellular telephone and a landline telephone. Finally, having selected communication device(s), the communications from a communications network are sent 403 to the selected communications device(s).

The multiple communication channel router described herein also enables a unique approach to routing telephone calls involving a cell phone and a packet-switched network. Because the router 100 can send communications via a packet-switched network 122, and a cell phone may also be able to connect to the packet-switched network, it is possible to rout a call through a cell phone via the packet-switched network. For example, if a cell phone is connected to the internet at a wireless hotspot in an airport, and a call is initiated by a landline telephone receiver in the home, the router 100 may determine that the cell phone is available over the packet—switched internet connection, and may route the call over the cellular network 132 via the packet switched network 122.

In another example, if a call is initiated by a cell phone in a wireless hotspot away from the home, the cell phone may send the call over the packet switched network to the wireless router 100 in the home. The router 100 then determines which network to use for the call. The router may for example route the call over a circuit-switched network 112, packet switched network 122, or cellular network 132. If the cellular network 132 is chosen by the router, the communications sent by the cell phone 133 to the router 100 may be sent back over the packet-switched network to the cell phone 133. Alternatively, the router 100 may simply pass control of the call back to the cell phone 133, and the cell phone may then proceed with the call in the regular way.

Figure 6:
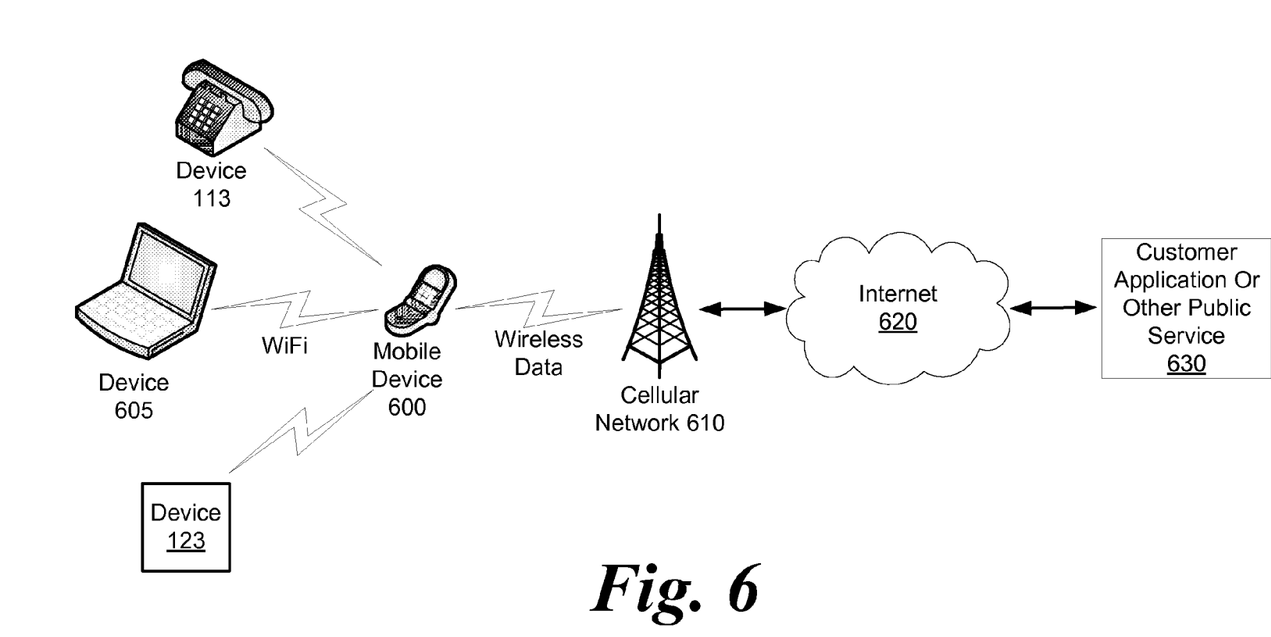
FIG. 6 illustrates an embodiment in which a mobile device 600 serves as a multiple communication channel router as contemplated herein.

FIG. 6 illustrates an embodiment in which a mobile device 600 serves as a router as contemplated herein whenever such device is in range of other devices such as 113, 605, and 123. Device 600 may be configured with logic 140 just as router 100, and may support physical as well as wireless interfaces for a variety of device and/or network communication channels.

Mobile device 600 may include a voice gateway configuration to allow it to behave as a VoIP gateway, a Private Branch Exchange (PBX) switch, and a cellular device. It may also have a web interface to manage configuration parameters. Parameters may include, for example, an access control list for devices that may connect to a cellular network 610 through the device 600, a dial plan, a gain between gateway elements, and Session Initiation Protocol (SIP) parameters. Web access can be via Bluetooth, WIFI connectivity, cellular network 610, or cable.

The mobile device 600 with WIFI capabilities can also provide broadband data connectivity via the cellular network 610 that is coupled to the Internet 620. For example, a portable laptop computer 605 with WIFI can establish WIFI communications with mobile device 600, which is in turn able to send and receive Internet 620 communications to any number of customer applications or other public services 630 through its connection to the cellular network 610 and Internet 620.

Figure 7:
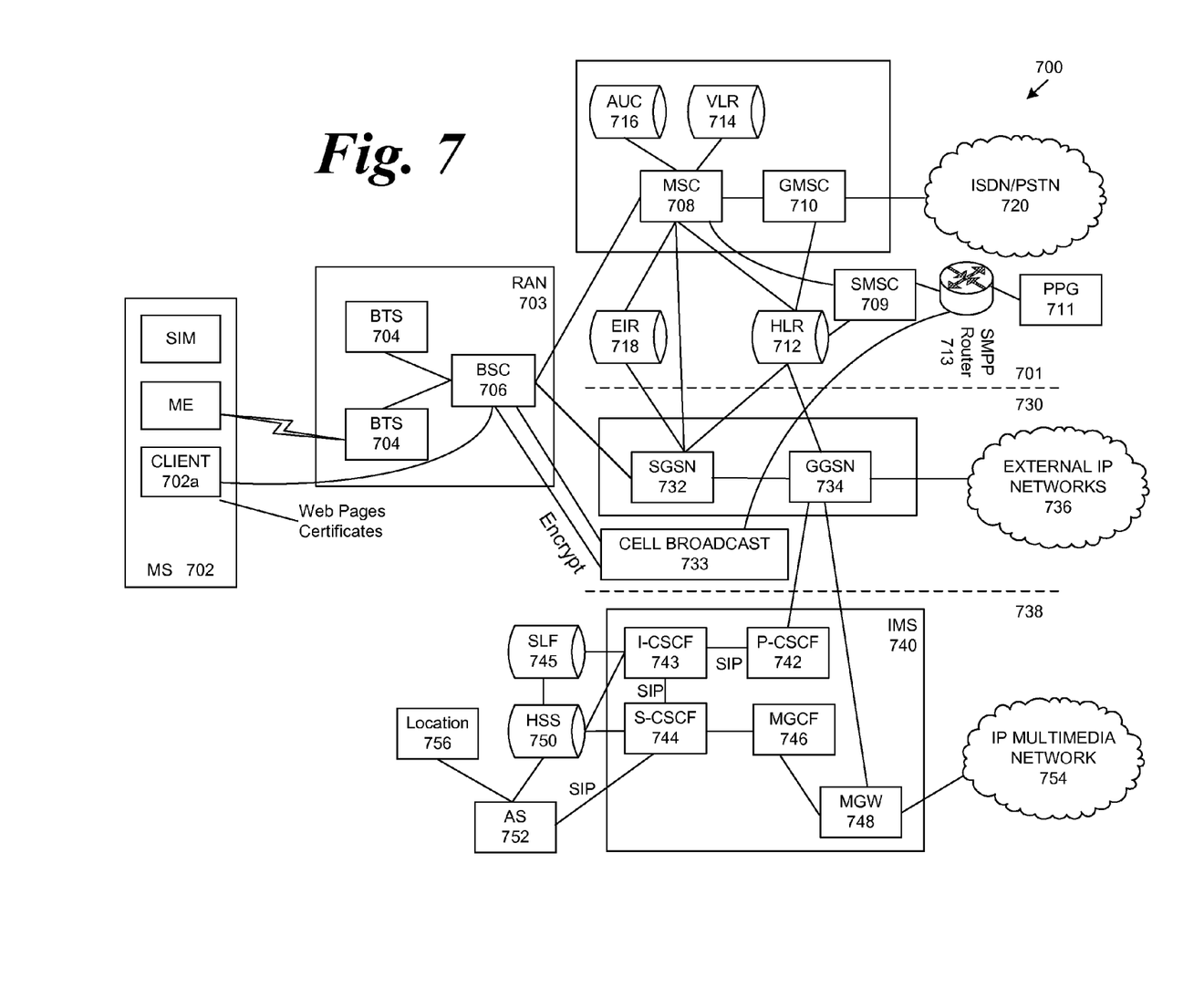
FIG. 7 illustrates a general operating environment of a mobile device.

FIG. 7 is directed to the general operating environment of a mobile device as provided herein. Terms such as "cellular communications" should be generally understood by those of skill in the art, and should be distinguished from other forms of wireless communications such as those based on the 802.11 protocols. FIG. 7 generally illustrates a cellular communications operating environment. The invention and the term cellular communications are not limited to any specific aspects of FIG. 7, but should rather be understood to operate in and refer to (respectively) operating environments such as the general type of operating environment illustrated in FIG. 7.

The global system for mobile communication ("GSM") is one of the most widely utilized cellular communications systems in today's fast growing telecommunication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High-Speed Downlink Packet Access ("HSDPA"), High-Speed Uplink Packet Access ("HSUPA"), cdma2000 1× Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

FIG. 7 shows another exemplary block diagram view of a GSM/GPRS/IP multimedia network architecture 700 in which the apparatus and methods for service delivery based on priority level and/or revenue impact of the present invention may be incorporated. As illustrated, architecture 700 of FIG. 7 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. In other words, the GMSC 710 provides interconnecting functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 733 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interconnecting functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 738 was introduced with 3GPP Release 5, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743 forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A multiple communication channel router comprising:
    a first device communications channel configured to send and receive communications from a wireless communications device, wherein said wireless communications device is configured to communicate with a wireless communications network using a wireless communications protocol;
    a second device communications channel configured to send and receive communications from a second communications device, wherein said second communications device is configured to communicate with a second communications network using a second communications protocol, said second communications protocol being different from said first communications protocol;

a first network communications channel configured to send and receive communications from said wireless communications network via said wireless communications device;

a second network communications channel configured to send and receive communications from said second communications network;

logic for selecting from among said network communications channels upon receiving communications from said second communications device, wherein any of said network communications channels may be selected for said communications from said second communications device, said logic configured to:

determine that said wireless communications device is in communication with said first device communications channel, retrieve a number of available minutes associated with said wireless communications device from said wireless communications network, determine that a destination of said communications from said second communications device is an in-network destination, determine a first cost for said first network communications channel based on said number of available minutes and the in-network destination, determine a second cost for said second network communications channel, and select said first network communications channel based on a comparison of said first cost and said second cost.

2. The multiple communication channel router of claim 1, wherein said wireless communications device comprises a cellular telephone and said wireless communications network comprises a cellular network.

3. The multiple communication channel router of claim 2, wherein said second communications device comprises a landline telephone and said second communications network comprises a circuit switched network.

4. The multiple communication channel router of claim 2, further comprising a third network communications channel configured to send and receive communications from a third communications network, said third communications network comprising a packet-switched network.

5. The multiple communication channel router of claim 4, further comprising a subsystem for sending said communications from said second communications device to said cellular telephone via said packet-switched network.

6. The multiple communication channel router of claim 4, wherein said third network communications channel utilizes a Voice Over Internet Protocol (VoIP) communications protocol.

7. The multiple communication channel router of claim 2, wherein said first device communications channel comprises a subsystem for wireless communications with said cellular telephone.

8. The multiple communication channel router of claim 7, wherein said subsystem for wireless communications implements an Institute of Electrical and Electronics Engineers (IEEE) 802.11 specification.

9. The multiple communication channel router of claim 7, wherein said first network communications channel utilizes said cellular telephone to send said communications via said cellular network by wirelessly sending said communications from said second communications device to said cellular telephone.

10. The multiple communication channel router of claim 2, wherein said first network communications channel utilizes said cellular telephone to send said communications via said cellular network.

11. The multiple communication channel router of claim 1, wherein said logic for selecting is further configured to determine that said destination of said communications from said wireless device is within a local calling area.

12. The multiple communication channel router of claim 11, wherein said logic for selecting is further configured to determine said second cost for said second network communications channel based on determining that said destination of said communications from said wireless device is within said local calling area.

13. The multiple communication channel router of claim 1, wherein said logic for selecting is further configured to determine that said destination of said communications from said wireless device is outside a local calling area.

14. The multiple communication channel router of claim 13, wherein said logic for selecting is further configured to determine said second cost for said second network communications channel based on determining that said destination of said communications from said wireless device is outside said local calling area.

15. The multiple communication channel router of claim 1, wherein said logic for selecting accounts for a time of day.

16. The multiple communication channel router of claim 1, wherein said logic for selecting comprises logic for determining an available communications channel.

17. The multiple communication channel router of claim 1, wherein said logic for selecting accounts for at least one user defined preference.

18. The multiple communication channel router of claim 1, further comprising logic for selecting from among said device communications channels upon receiving communications from a communications network, wherein any of said device communications channels may be selected for said communications from said first communications network.

19. The multiple communication channel router of claim 18, further comprising logic for selecting a plurality of device communications channels.

20. The multiple communication channel router of claim 18, wherein said logic for selecting from among said device communications channels accounts for a destination associated with an incoming communication.

21. The multiple communication channel router of claim 1, wherein said logic for selecting from among said device communications channels accounts for at least one user defined preference.

22. A multiple communication channel router comprising:

a first device communications channel configured to send and receive communications from a wireless communications device, wherein said wireless communications device is natively associated with a wireless communications network;

a second device communications channel configured to send and receive communications from a second communications device, wherein said second communications device is natively associated with a second communications network, said second communications network being distinct from said first network;

a first network communications channel configured to send and receive communications from said wireless communications network via said wireless communications device;

a second network communications channel configured to send and receive communications from said second communications network;

logic for selecting from among said device communications channels upon receiving communications from said wireless communications device, wherein any of said device communications channels may be selected for said communications from said wireless communications device, said logic configured to:

determine that said wireless communications device is in communication with said first device communications channel, retrieve a number of available minutes associated with said wireless communications device from said wireless communications network, determine that a destination of said communications from said first wireless device is an in-network destination, determine a first cost for said first network communications channel based on said number of available minutes and the in-network destination, determine a second cost for said second network communications channel, and select said first network communications channel based on a comparison of said first cost and said second cost.

23. A method for selecting among a plurality of available communications networks, comprising:

receiving communications from a wireless communications device at a multiple communication channel router;

retrieving, at the multiple communication channel router, a number of available minutes associated with said wireless communications device from a wireless communications network;

determining that a destination of said communications from said wireless communications device is an in-network destination;

based on the number of available minutes and the in-network destination, determining a first cost for transmitting said communications via said wireless communications network;

determining a second cost for transmitting said communications via a second communications network;

selecting, at the multiple communication channel router based on a comparison of said first cost and said second cost, a communications network from among the wireless communications network and the second communications network;

sending said communications from said wireless communications device via a selected communications network.

24. The method of claim 23, wherein said wireless communications device comprises a cordless landline telephone.

25. The method of claim 23, wherein said wireless communications device comprises a cellular telephone.

26. The method of claim 23, wherein said second communications network comprises one of a cellular network, a circuit switched network, and a packet switched network.

27. The method of claim 23, wherein said communications are implemented according to an Institute of Electrical and Electronics Engineers (IEEE) 802.11 specification.

28. The method of claim 23, wherein said selected communications network is said wireless communications network, and wherein sending said communications comprises sending said communications to said wireless communications device, said wireless communications device subsequently sending said communications via said wireless communications network.

29. The method of claim 26, wherein said packet switched network utilizes a Voice Over Internet Protocol (VoIP) communications protocol.

30. The method of claim 23, further comprising determining that said destination of said communications from said wireless device is within a local calling area.

31. The method of claim 30, further comprising determining the second cost for transmitting said communications via a second communications network based on determining that said destination of said communications from said wireless device is within said local calling area.

32. The method of claim 23, further comprising determining that said destination of said communications from said wireless device is outside a local calling area.

33. The method of claim 32, further comprising determining the second cost for transmitting said communications via a second communications network based on determining that said destination of said communications from said wireless device is outside said local calling area.

34. The method of claim 23, wherein said selecting said communications network accounts for a time of day.

35. The method of claim 23, wherein said selecting comprises determining an available communications channel.

36. The method of claim 23, wherein said selecting said communications network accounts for at least one user defined preference.

37. A method for selecting among a plurality of available communications networks, comprising:

receiving communications from a first communications device at a multiple communication channel router;

determining, at said multiple communication channel router, that a wireless communications device is in communication with a wireless communications network;

retrieving, at the multiple communication channel router, a number of available minutes associated with said wireless communications device from said wireless communications network;

determining that a destination of said communications from said first communications device is an in-network destination;

based on the number of available minutes and the in-network destination, determining a first cost for transmitting said communications via said wireless communications network;

determining a second cost for transmitting said communications via a first communications network;

selecting, at the multiple communication channel router based on a comparison of said first cost and said second cost, a communications network from among said first communications network and said wireless communications network;

sending said communications from said first communications device to a selected communications network.

38. The method of claim 37 wherein said first communications network is one of a cellular network, a circuit switched network, and a packet switched network.

39. The method of claim 37, wherein said selecting a communications network accounts for determining whether the destination of said communications from said first communications device is within a local calling area.

40. The method of claim 37, wherein said selecting a communications network accounts for at least one user defined preference.

* * * * *